United States Patent

[11] 3,593,783

| [72] | Inventors | Gerhard Muller<br>Esslingen;<br>Fritz Mohring, Nellingen, both of, Germany |
|---|---|---|
| [21] | Appl. No. | 744,427 |
| [22] | Filed | July 12, 1968 |
| [45] | Patented | July 20, 1971 |
| [73] | Assignee | J. Eberspacher<br>Esslingen, Neckar, Germany |
| [32] | Priority | July 15, 1967 |
| [33] | | Germany |
| [31] | | E 34397 |

[54] HEAT EXCHANGER FOR MOTOR VEHICLE HEATERS
7 Claims, 3 Drawing Figs.

[52] U.S. Cl. .................................................. 165/164
[51] Int. Cl. ........................................................ F28d 7/02
[50] Field of Search ........................................ 165/164,
120, 165, 129, 130, 148, 154; 122/214; 126/63,
64, 65, 71, 72, 91 A, 91

[56] References Cited
UNITED STATES PATENTS

| 2,288,258 | 6/1942 | Ward.......................... | 126/67 |
| 1,966,133 | 7/1934 | Pieber........................ | 165/164 X |
| 2,343,315 | 3/1944 | Morrison..................... | 165/164 X |
| 3,402,764 | 9/1968 | Fairbanks.................... | 165/154 X |

FOREIGN PATENTS

| 1,131,380 | 6/1962 | Germany..................... | 126/91 |

*Primary Examiner*—Frederick L. Matteson
*Assistant Examiner*—Theophil W. Streule
*Attorney*—McGlew and Toren

ABSTRACT: A heat exchanger for motor vehicle heater comprises two mating outer half shells and two mating inner half shells, the outer and inner half shells preferably being integral with each other. The shells are formed with stamped mating half ducts which, when the half shells are assembled in mating relation, define respective separated flow paths for a heating medium and for a fluid heat exchange medium. The half shells may be stamped to conjointly define a combustion chamber on the axis of symmetry.

PATENTED JUL 20 1971 3,593,783

Inventors
GERHARD MÜLLER
FRITZ MOHRING 3,593,783

HEAT EXCHANGER FOR MOTOR VEHICLE HEATERS

BACKGROUND OF THE INVENTION

There are known heat exchangers, provided with combustion chambers, and these are used particularly in motor vehicle heaters designed to provide heat when the vehicle is stationary and particularly when the vehicle engine is not operating. These known heat exchanger arrangements are manufactured primarily as coil heat exchangers, wherein the coil of the heat exchanger is arranged concentrically about the combustion chamber. In these known arrangements, the inlet and outlet nipples for the heat exchange medium, usually air, are welded on the heat exchanger jacket as separately produced nipples.

These known arrangements are very complicated in their manufacture and consequently expensive. In addition, the most widely used concentric arrangement of a heat exchanger requires large diameters and yields a relatively poor efficiency.

SUMMARY OF THE INVENTION

This invention relates to heat exchangers for motor vehicle heaters and, more particularly, to a novel heat exchanger which is simple and inexpensive in construction and which preferably includes an internal combustion chamber.

The objective of the present invention is to provide such a heat exchanger whose manufacture is substantially simpler, and thus less expensive and more economical, than known heat exchangers for this purpose. In accordance with the invention, a heat exchanger is characterized in that it consists of two outer and two inner half shells with stamped half ducts which, when the two half shells are assembled in mating relation, define respective separated flow paths for a heating fluid and a fluid heat exchange medium. Preferably, the mating half shells are stamped with formations which, when the mating half shells are assembled, define a combustion chamber.

A heat exchanger in accordance with the present invention has the great advantage that the number of parts to be produced, as well as their supply, can be considerably reduced. In addition, only a single stamping operation is required for the manufacture of the half shells. After assembly, the half shells, which are joined to each other by welding, dotting, or flanging, define the necessary ducts for flow of the fluid heating medium and the fluid heat exchange medium, due to the stamped half duct portions thereof.

In a further development of the invention, half of an exhaust gas nipple is stamped into each inner half shell. This further simplifies the assembly, as the necessary exhaust gas nipple no longer has to be produced separately and welded in place.

In accordance with a further feature of the invention, substantial savings can be attained if the inner and outer half shells have the same form. Optimum manufacturing operations are possible with optimum utilization of the necessary presses, and a minimum supply, with respect to this feature of the invention. The economy of the arrangement of the invention of two identical half shells is further increased by the fact that the supply of spare parts can be reduced by half with the same stock, as related to the number of heat exchangers.

Preferably, the portions forming the combustion chamber are stamped on the axis of symmetry, in the case of motor vehicle heaters usable when the motor vehicle engine is not operating. Tests have shown that the efficiency is very considerably improved in accordance with the invention arrangement.

As yet a further feature of the present invention, openings are provided between the individually stamped half ducts for the hearing gas, and preferably extend at a right angle to the flow direction. It was found that, with corresponding guidance of the heating gases, particularly with a favorable ratio of length to diameter of the heating gas ducts, undesired vibrations may occur and these can be prevented by such openings.

Furthermore, it has been found expedient, as a further development of the invention, to stamp passages into the inner shells and/or outer shells which form, with the outer shells and/or inner shells, ducts for guiding the heat exchange medium. Furthermore, the inlet and outlet ports for the heating gas ducts and for the ducts for providing flow of the heat exchange medium are so arranged that heat exchange takes place in counterflow. Naturally, the arrangement can also be such that heat exchange takes place in codirectional flow. This measures has the effect that the parts of the heat exchanger can be produced in one operation.

As a further feature of the invention, bosses to be drilled for the connection of structural elements, such as thermocouples, fuel supply pumps, and so forth, are formed on the half shells. These bosses can also be used for receiving nipples through which liquid fuel is supplied in the ungassified state, for example, at an angle of 20 to 60° to the horizontal, in order to be ignited in the combustion chamber.

An object of the invention is to provide an improved, simplified and more economical heat exchanger for motor vehicle heaters.

Another object of the invention is to provide such heat exchanger including an internal combustion chamber.

A further object of the invention is to provide such a heating chamber which consists of two outer and two inner half shells with stamped half ducts cooperable to provide flow paths for a fluid heating medium and a fluid heat exchange medium.

Still another object of the invention is to provide such a heat exchanger in which the half shells are stamped with formations which conjointly define an exhaust gas nipple.

A further object of the invention is to provide such a heat exchanger in which the inner and outer half shells have the same form.

Another object of the invention is to provide such a heat exchanger including openings between individual ducts for the heating gas and preferably extending at a right angle to the flow direction.

A further object of the invention is to provide such a heat exchanger in which the shells are formed, during the stamping operation, with bosses which can be drilled for connection of structural elements.

For an understanding of the principles of the invention, reference is made to the following description of a typical embodiment thereof as illustrated in the accompanying drawings.

DESCRIPTION OF THE PREFERRED EMBODIMENT

Figure 1:
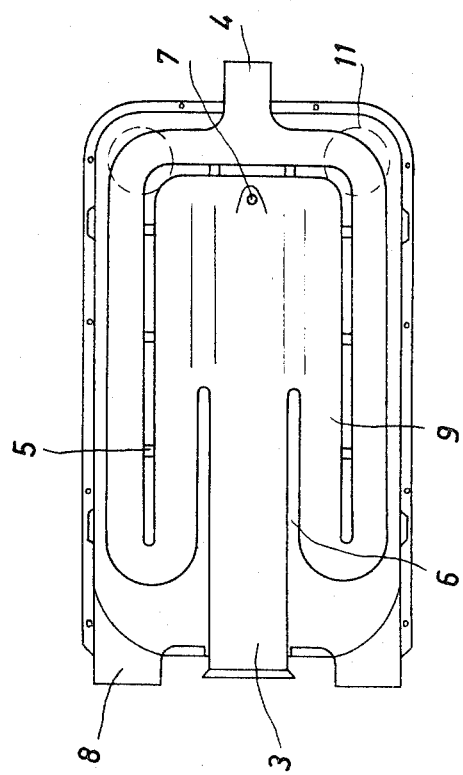
FIG. 1 is a top plan view of one-half of a heat exchanger embodying the invention.
Figure 3:
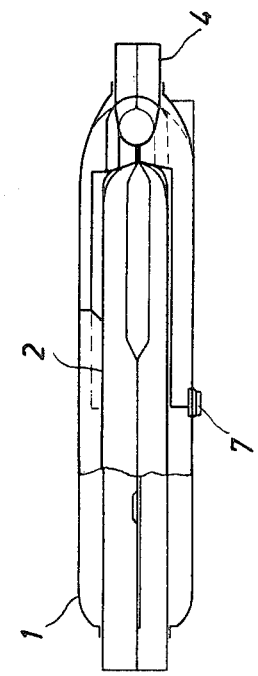
FIG. 3 is a side elevation view, partly broken away, of the heat exchanger embodying the invention.
Figure 2:
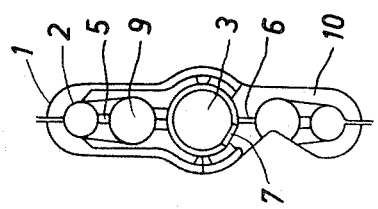
FIG. 2 is a transverse sectional view of a heat exchanger embodying the invention.

Referring to the drawings, the heat exchanger embodying the invention comprises two mating outer half shells 1 and two mating inner half shells 2. The half shells are stamped with half ducts which, when the mating half shells are assembled in mating relation, define respective separated flow paths 9, for heating fluid, and 10, for a fluid heat exchange medium.

Each mating half shell is also stamped to form one-half of a combustion chamber 3 and one-half of an exhaust nipple 4 communicating with the combustion chamber. The heating medium produced in combustion chamber 3, such as gaseous products of combustion, is fed through duct 9 to exhaust gas nipple 4.

Since duct 9 has a deflection of 180°, and there is a possibility that vibrations of the gas column of the heating medium may occur, openings 5 are provided, which serve to reduce these vibrations. These openings 5 preferably extend at right angles to the flow direction.

The fluid heat exchange medium is fed to the passages 10, in the space between the inner and outer shells, through inlet nipple 8 and flows through ducts formed by the impressed half passages. An alternative embodiment of the invention includes an additional inlet nipple 11 provided, preferably on the underside of the heat exchanger, which provides for flow of the heat exchange medium in the same direction as the flow of the heating medium.

In addition, each of the half shells is formed with bosses or the like which may be drilled to receive structural elements such as thermocouples, a fuel supply pump, and the like. It will be noted, as indicated at 6, that the heat exchange medium can surround the combustion chamber 3.

What we claim is:

1. A heat exchanger for motor vehicle heaters comprising, in combination, two mating inner half shells formed with stamped mating half ducts and being secured together to form a sinously arranged first flow path, said first flow path comprising consecutively arranged flow path sections disposed at least in part in coextensive relationship with one another and angularly bent flow path sections interconnecting immediately succeeding said flow path sections for changing the direction of flow through said first flow path, two mating outer half shells formed with stamped half ducts and being secured together and enclosing said mating inner half shells, said outer half shells being spaced outwardly from said inner half shells and forming therebetween a second flow path separated from said first flow path so that a heating gas flows within one of said first and second flow paths in indirect heat transfer relationship with a fluid heat exchange medium flowing in the other of said first and second flow paths, and a plurality of openings spaced along said first flow path extending between coextensively disposed said flow path sections for bypassing flow between the interconnected said flow path sections for preventing the development of vibrations due to the sinuous arrangement of said first flow path.

2. A heat exchanger for motor vehicle heaters, as set forth in claim 1, wherein said first flow path having an inlet at one end thereof and an outlet at the opposite end thereof and said first flow path being arranged to contain the heating gas with the fluid heat exchange medium being contained within said second flow path.

3. A heat exchanger for motor vehicle heaters, as set forth in claim 2, wherein the portion of said first flow path extending from its inlet end forming a combustion chamber for supplying heating gas into said flow path sections.

4. A heat exchanger for motor vehicle heaters, as set forth in claim 3, wherein said openings between said flow path sections being spaced downstream in said first flow path from said combustion chamber.

5. A heat exchanger for motor vehicle heaters, as set forth in claim 4, wherein said first flow path branching into two separate consecutively arranged sets of flow path sections with the oppositely disposed outlet ends of said flow path sections being in communication with each other at the outlet from said first flow path.

6. A heat exchanger for motor vehicle heaters, as set forth in claim 1, in which an exhaust nipple is stamped into said inner half shells and forms the outlet from said first flow path.

7. A heat exchanger for motor vehicle heaters, as set forth in claim 4, wherein said openings extending between said flow path sections being disposed perpendicular to the axis of said flow path sections.